United States Patent
Powers et al.

(10) Patent No.: US 9,983,857 B2
(45) Date of Patent: May 29, 2018

(54) DYNAMIC COMPUTATIONAL ACCELERATION USING A HETEROGENEOUS HARDWARE INFRASTRUCTURE

(71) Applicant: Architecture Technology Corporation, Minneapolis, MN (US)

(72) Inventors: Judson Powers, Ithaca, NY (US); Noel E. Schmidt, Bloomington, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 120 days.

(21) Appl. No.: 14/741,399

(22) Filed: Jun. 16, 2015

(65) Prior Publication Data

US 2016/0371081 A1 Dec. 22, 2016

(51) Int. Cl.
*G06F 9/455* (2018.01)
*G06F 9/46* (2006.01)
(Continued)

(52) U.S. Cl.
CPC ............ *G06F 8/41* (2013.01); *G06F 8/447* (2013.01); *G06F 8/451* (2013.01); *G06F 9/455* (2013.01);
(Continued)

(58) Field of Classification Search
CPC ............ G06F 8/40–8/54; G06F 9/4806; G06F 9/4843–9/5055
(Continued)

(56) References Cited

U.S. PATENT DOCUMENTS 5,590,281 A * 12/1996 Stevens ............... G06F 9/54
 709/227
6,336,213 B1 * 1/2002 Beadle ............ G06F 9/45516
 717/118

(Continued)

OTHER PUBLICATIONS

Kaleem, R., et al., Adaptive Heterogeneous Scheduling for Integrated GPUs, Proceedings of the 23rd international conference on Parallel architectures and compilation, Aug. 24-27, 2014, pp. 151-162, [retrieved on Dec. 11, 2017], Retrieved from the Internet: <URL:http://dl.acm.org/>.*

(Continued)

*Primary Examiner* — Geoffrey St Leger
(74) *Attorney, Agent, or Firm* — Shumaker & Sieffert, P.A.

(57) ABSTRACT

An example method includes, during execution of a software application in a computing system comprising a plurality of processing units, identifying platform-independent instructions that are configured to perform at least one computational task, wherein the plurality of processing units comprises a heterogeneous group, and wherein the platform-independent instructions have a format that is not specific to any particular processing unit in the plurality of processing units, determining one or more scheduling criteria that are associated with the platform-independent instructions, and selecting, from the heterogeneous group of processing units and based on the scheduling criteria, a processing unit to perform the at least one computational task. The example method further includes converting the platform-independent instructions into platform-dependent instructions, wherein the platform-dependent instructions have a format that is specific to the selected processing unit, and executing, by the selected processing unit, the platform-dependent instructions to perform the at least one computational task.

31 Claims, 5 Drawing Sheets

(51) Int. Cl.
  G06F 9/48  (2006.01)
  G06F 9/45  (2006.01)
(52) U.S. Cl.
  CPC ...... *G06F 9/45504* (2013.01); *G06F 9/45516* (2013.01); *G06F 9/46* (2013.01); *G06F 9/4843* (2013.01); *G06F 9/4881* (2013.01)
(58) Field of Classification Search
  USPC .......................... 717/136–161; 718/102–105
  See application file for complete search history.

(56) References Cited

U.S. PATENT DOCUMENTS

| | | | | |
|---|---|---|---|---|
| 6,513,057 | B1* | 1/2003 | McCrory | G06F 9/4881 710/6 |
| 6,813,764 | B2* | 11/2004 | Stoodley | G06F 9/44521 717/118 |
| 7,213,240 | B2* | 5/2007 | Wong | G06F 8/443 717/148 |
| 7,444,632 | B2* | 10/2008 | Minor | G06F 9/5044 717/166 |
| 8,271,987 | B1* | 9/2012 | Willeford | G06Q 10/06311 705/7.12 |
| 8,281,311 | B2* | 10/2012 | Barsness | G06F 9/5072 718/104 |
| 8,347,291 | B2* | 1/2013 | Marwinski | G06F 9/4881 718/100 |
| 8,375,374 | B2* | 2/2013 | O'Brien et al. | G06F 8/451 717/149 |
| 8,387,077 | B1* | 2/2013 | Getlin | G06F 9/54 718/1 |
| 8,479,178 | B2* | 7/2013 | Aharoni | G06F 9/45516 717/148 |
| 8,539,256 | B2* | 9/2013 | Barsness | G06F 1/3203 713/300 |
| 8,543,992 | B2* | 9/2013 | Jiang | G06F 8/4442 717/149 |
| 8,555,287 | B2* | 10/2013 | Ding | G06F 9/505 718/102 |
| 8,601,490 | B2* | 12/2013 | Sureshan | G06F 13/00 717/101 |
| 8,615,750 | B1* | 12/2013 | Narayana Iyer | G06F 8/456 709/203 |
| 8,671,418 | B2* | 3/2014 | Barsness | G06F 9/5055 719/331 |
| 8,683,468 | B2* | 3/2014 | Breternitz | G06F 9/5066 718/100 |
| 8,707,314 | B2* | 4/2014 | Gummaraju | G06F 9/5044 718/102 |
| 8,719,415 | B1* | 5/2014 | Sirota | G06F 9/5061 709/221 |
| 8,782,645 | B2* | 7/2014 | Breternitz | G06F 9/5083 718/100 |
| 8,924,539 | B2* | 12/2014 | Ferris | G06F 9/5072 709/224 |
| 2002/0166113 | A1* | 11/2002 | Stoodley | G06F 9/44521 717/140 |
| 2003/0070161 | A1* | 4/2003 | Wong | G06F 8/443 717/148 |
| 2010/0205137 | A1* | 8/2010 | Barsness | G06F 1/3203 706/52 |
| 2011/0035751 | A1* | 2/2011 | Krishnakumar | G06F 9/4881 718/103 |
| 2011/0296390 | A1 | 12/2011 | Vidal et al. | |
| 2012/0233486 | A1* | 9/2012 | Phull | G06F 9/5083 713/375 |
| 2012/0233602 | A1* | 9/2012 | Ramaswamy | G06F 9/45516 717/148 |
| 2013/0047138 | A1 | 2/2013 | Radez | |
| 2013/0160016 | A1* | 6/2013 | Gummaraju | G06F 9/5044 718/102 |
| 2013/0222399 | A1* | 8/2013 | Bourd | G06T 1/20 345/506 |
| 2014/0344810 | A1* | 11/2014 | Wang | G06F 9/455 718/1 |
| 2015/0095917 | A1* | 4/2015 | Challenger | G06F 9/4843 718/104 |
| 2015/0347102 | A1* | 12/2015 | Lattner | G06F 8/41 717/146 |
| 2016/0048376 | A1* | 2/2016 | Charupally | G06F 8/41 717/158 |
| 2017/0109210 | A1* | 4/2017 | Goossens | G06F 9/45516 |

OTHER PUBLICATIONS

You, Y-P., et al., VirtCL: A Framework for OpenCL device abstraction and management, Proceedings of the 20th ACM SIGPLAN Symposium on Principles and Practice of Parallel Programming, 2015, pp. 161-172, [retrieved on Dec. 11, 2017], Retrieved from the Internet: <URL:http://dl.acm.org/>.* de Oliveira, L. M. P., A Framework for Scientific Computing with GPUs, Dissertation, Universidade Nova de Lisboa, 2011, 113 pages, [retrieved on Dec. 11, 2017], Retrieved from the Internet: <URL:https://run.unl.pt/handle/10362/7817>.*

Lyerly, R. F., Automatic Scheduling of Compute Kernels Across Heterogeneous Architectures, Master of Science, Virginia Polytechnic Institute and State University, May 7, 2014, 102 pages, [retrieved on Jan. 29, 2018], Retrieved from the Internet: <URL:https://vtechworks.lib.vt.edu/handle/10919/78130>.*

Abdulla et al. "Lightweight Virtualization Based Security Enforcement in Mobile Devices." Center for Secure Information Systems George Mason University, http://cs.gmu.edu/~astavrou/courses/ISA_862_F10/lightvirt.pdf., retrieved on Jul. 27, 2015, 25 pp.

Russel, "Iguest: Implementing the little Linux hypervisor," IBM OzLabs, retrieved from http://landley.net/kdocs/ols/2007/ols2007v2, pages-173-178.pdf, Jun. 27-30, 2007, 8 pp.

Mitasch, "Lightweight Virtualization: LXC Best Practices," LinuxCon Barcelona 2012, http://www.thomas-krenn.com/de/wikiDE/images/c/cf/20121106-Lighweight_Virtualization_LXC_Best_Practices.pdf, 28 pp.

"Introduction to Portable Native Client," The Chromium Projects, retrieved on Feb. 18, 2015, from http://www.chromium.org/nativeclient/pnacl/introduction-to-portable-native-client, 3 pp.

"NaCl and PNaCl," Google Chrome, retrieved on Feb. 18, 2015, from https://developer.chrome.com/native-client/nacl-and-pnacl, 4 pp.

"OpenShift," by Red Hat, retrieved on Feb. 18, 2015, from http://www.redhat.com/en/technologies/cloud-computing/openshift, 6 pp.

"OpenShift Platform as a Service (PaaS)," by Red Hat, retrieved on Feb. 18, 2015, from http://www.redhat.com/developers/openshift, 2 pp.

"Grand Central Dispatch (GCD) Reference," retrieved on Mar. 3, 2015, Apple Inc., from https://developer.apple.com/ library/prerelease/ios/documentation/Performance/Reference/GCD_libdispatch_Ref/index.html, 6 pp.

"Grand Central Dispatch," Wikipedia, retrieved on Mar. 3, 2015, from http://en.wikipedia.org/wiki/Grand_Central_Dispatch, 6 pp.

"libclc," OpenCL 1.1 Specification, retrieved on Apr. 27, 2015, from http://libclc.11bm.org, 1 pp.

"The first open standard intermediate language for parallel compute and graphics," Khronos Group, retrieved on Apr. 27, 2015, from https://www.khronos.org/spir, 4 pp.

AF SBIR/STTR Award Details, Air Force, "LAVA: Lightweight Application Virtualization Architecture," Award Details (Start: Jun. 23, 2014, End: Mar. 23, 2015), Retrieved on Jun. 16, 2015 from http://www.afsbirsttr.com/award/AwardDetails.aspx?pk=21652, 2 pp.

* cited by examiner

DYNAMIC COMPUTATIONAL ACCELERATION USING A HETEROGENEOUS HARDWARE INFRASTRUCTURE

BACKGROUND

In many instances, specialized computing hardware, such as specialized processing units, can provide better performance than general-purpose central processing units (CPU's). While CPU's are extremely flexible, specialized computer hardware sacrifices some of this flexibility to obtain performance gains for certain types of problems. For example, specialized processing units, such as graphics processing units (GPU's) and field-programmable gate arrays (FPGA's), are often readily available, relatively inexpensive, and widely used. GPU's, in particular, are very well suited to many classes of highly parallel, computationally intensive tasks and can provide 10 to 100 times better performance per watt and per dollar than CPU's for many applications. Consequently, GPU's and even FPGA's are now used in many high-performance computing (HPC) systems. A particular hardware platform can contain a number of different types of processing units.

SUMMARY

In one example, a method includes, during execution of a software application in a computing system comprising a plurality of processing units, identifying platform-independent instructions that are configured to perform at least one computational task, wherein the plurality of processing units comprises a heterogeneous group that includes at least two different types of processing units, and wherein the platform-independent instructions have a format that is not specific to any particular processing unit in the plurality of processing units, determining one or more scheduling criteria that are associated with the platform-independent instructions, and selecting, from the heterogeneous group of processing units and based on the one or more scheduling criteria, a processing unit to perform the at least one computational task. The method further includes converting the platform-independent instructions into platform-dependent instructions, wherein the platform-dependent instructions have a format that is specific to the selected processing unit, and executing, by the selected processing unit, the platform-dependent instructions to perform the at least one computational task.

In one example, a computing system includes a plurality of processing units, wherein the plurality of processing units comprises a heterogeneous group that includes at least two different types of processing units. One or more of the plurality of processing units are configured to, during execution of a software application, identify platform-independent instructions that are configured to perform at least one computational task, wherein the platform-independent instructions have a format that is not specific to any particular processing unit in the plurality of processing units, determine one or more scheduling criteria that are associated with the platform-independent instructions, and select, from the plurality of processing units based on the one or more scheduling criteria, a processing unit to perform the at least one computational task. The plurality of processing units are further configured to convert the platform-independent instructions into platform-dependent instructions, wherein the platform-dependent instructions have a format that is specific to the selected processing unit, and execute, by the selected processing unit, the platform-dependent instructions to perform the at least one computational task.

In one example, a computer-readable storage medium comprising instructions that, when executed, cause a computing system comprising a plurality of processing units to perform operations comprising: during execution of a software application, identifying platform-independent instructions that are configured to perform at least one computational task, wherein the plurality of processing units comprises a heterogeneous group that includes at least two different types of processing units, and wherein the platform-independent instructions have a format that is not specific to any particular processing unit in the plurality of processing units; determining one or more scheduling criteria that are associated with the platform-independent instructions; selecting, from the plurality of processing units based on the one or more scheduling criteria, a processing unit to perform the at least one computational task; converting the platform-independent instructions into platform-dependent instructions, wherein the platform-dependent instructions have a format that is specific to the selected processing unit; and executing, by the selected processing unit, the platform-dependent instructions to perform the at least one computational task.

The details of one or more examples are set forth in the accompanying drawings and the description below. Other features, objects, and advantages of the disclosure will be apparent from the description and drawings, and from the claims.

DETAILED DESCRIPTION

One unsolved challenge in using specialized hardware efficiently in an HPC environment is effectively distributing computational work among multiple processing units contained within a single hardware platform or computing system. As noted above, a particular hardware platform or computing system can contain a number of different types of processing units (e.g., one or more CPU's, one or more GPU's, and one or more FPGA's), while a software application may have tens or hundreds of computational algorithms with different demands. For improved efficiency, software tasks may be assigned to run on hardware resources so that each resource is optimally utilized. Achieving such efficiency, however, may be particularly challenging if the software's workload, based on which computational tasks are performed and with which kinds of inputs, is not necessarily known in advance or is dynamically changing.

Current approaches to performing computational tasks on hardware resources are often too strongly tied to individual vendors' hardware platforms and require the software application to have too much knowledge about the hardware on which it will run on and the software workload. These approaches can make software development more difficult and may limit the end user's flexibility in building, upgrading, and maintaining the hardware platform for an HPC system.

One or more techniques described in the present disclosure provide a software platform for efficiently distributing computing tasks in an HPC environment among multiple specialized hardware devices, such as specialized processing units. This software platform or framework may be referred to as Dynamic Acceleration using Specialized Hardware, or DASH. DASH enables HPC software to effectively utilize available computational resources on a system, and particularly heterogeneous collections of specialized hardware. DASH provides an interface to hardware systems built from multiple components, such as off-the-shelf components, enabling a single software application to obtain hardware-accelerated performance on many different nodes (e.g., processing units) of a distributed computing system, even when individual computing systems have different hardware configurations.

As described herein, in one or more examples, DASH provides a software platform that is capable of efficiently distributing computational tasks in a program among the hardware computing resources (e.g., processing units) available on the current system. DASH provides a unified and effective platform for acceleration of computational tasks. In various cases, DASH may provide a higher-performance hardware infrastructure for improved modeling and simulation software capabilities (e.g., real-time six degrees of freedom simulation modeling and propagation), allowing technology integration and computational performance within simulation programs. Various different types of processing units (e.g., CPU's, GPU's, FPGA's) may be utilized in the infrastructure to enable, in some examples, massively parallel computing (MPC) and computationally intensive applications that are part of a distributed computing environment. When used with modeling and simulation software, DASH may provide the capability for a single simulation hardware platform to simultaneously process hundreds of threads in parallel within a common, distributed environment. DASH may also leverage certain storage and memory technology, such as enterprise-class redundant array of independent disks (RAID) configurations and solid state drives (SSD's) to enable rapid data manipulation to achieve high and sustained computational throughput.

The use of DASH may enable an end user to choose hardware configurations for individual nodes of a hardware platform based on the operating environment and processing demands for each particular node. For example, end users can use off-the-shelf components that meet their particular operational and environmental requirements, confident in the knowledge that their software will utilize the capabilities of the various hardware resources in the platform. These users can also incrementally upgrade hardware and build distributed computing systems where different computing systems use different hardware, without necessarily having to rely on the application to specifically support that hardware. DASH gives end users software flexibility in choosing computing hardware and enables improvement in the overall performance of their computing system(s).

In various examples, DASH provides an improvement to using Open Computing Language (OpenCL) in heterogeneous hardware systems, particularly with HPC workloads that are dynamic or unpredictable, and makes OpenCL software able to take advantage of the use of certain types of processing units within such systems. DASH may provide certain advantages in hardware flexibility and make it possible to hit different points in the tradeoffs in cost, energy consumption, and performance.

Figure 1:
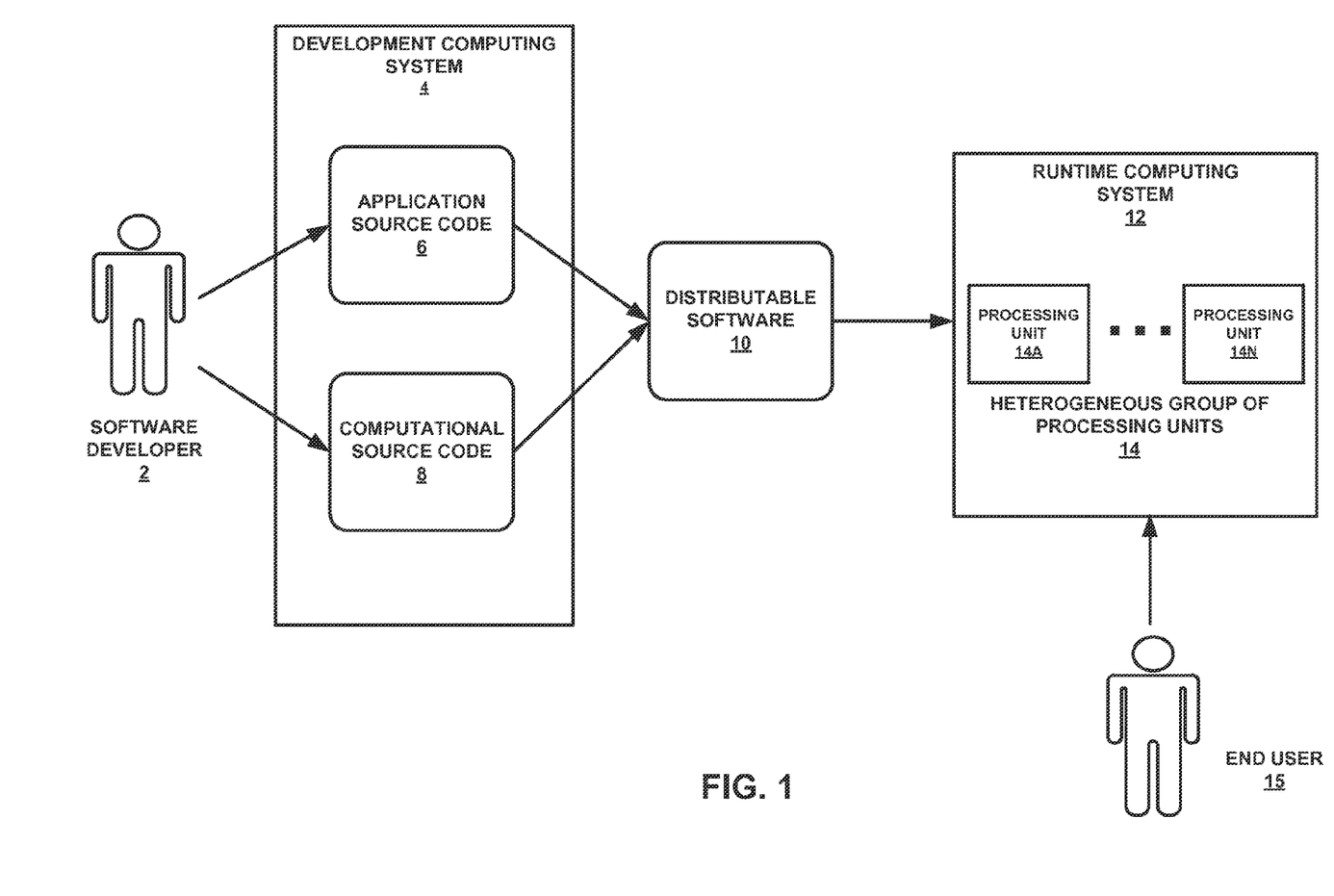
FIG. 1 is a block diagram illustrating an example development computing system and an example runtime computing system, in accordance with one or more aspects of the present disclosure.

FIG. 1 is a block diagram illustrating an example development computing system 4 and an example runtime computing system 12, in accordance with one or more aspects of the present disclosure. As shown in FIG. 1, a software developer 2 may use development computing system 4 to generate distributable software 10, which may be executed in runtime computing system 12 by an end user 15. Runtime computing system 12 may comprise a heterogeneous, distributed computing system or environment that includes a heterogeneous group of processing units 14A-14N (collectively, "processing units 14"). In the example of FIG. 1, processing units 14 comprise at least two different types of specialized processing units. For example, processing units 14 may include one or more CPU's, one or more processing units that utilize the many-integrated-core architecture, one or more GPU's, and/or one or more FPGA's. As described herein, CPU's, GPU's, and FPGA's, to name only a few examples, comprise different types of processing units.

In various examples, the DASH platform comprises two components: the software development toolchain, which is used by software developer 2 to develop HPC computational software (e.g., a modeling and simulation application); and the runtime, which is software that runs on runtime computing system 12 alongside the computational software for end user 15. Software developer 2 may utilize the development toolchain provided by development computing system 4 to generate executable, distributable software 10. To generate distributable software 10, software developer 2 may author or otherwise create application source code 6 and computational source code 8, as will be described in further detail below in reference to FIG. 2. Development computing system 4 may combine, or bundle, application source code 6 with computational source code 8 to generate distributable software 10. Software developer 2 may create application source code 6 using any programming language and/or software development toolchain. However, software developer 2 may identify any computationally intensive and/or parallelizable functions (e.g., a linear algebra solver), and/or may refactor or create these functions in computational source code 8. In some instances, software developer 2 may identify such computationally intensive and/or parallelizable functions through the use of software profiling and/or automated tools.

In some examples, computational source code 8 may comprise OpenCL code. OpenCL is a programming language, which is based on the C programming language, for writing computational functions, called kernels, which may be executed in hardware-accelerated platforms. An OpenCL kernel is similar to a function in a software library, but it conveys information about the parallel structure of the code that a compiler and hardware may use to create the highly parallel execution that is at the heart of hardware acceleration. Unlike many other hardware-acceleration architectures, OpenCL kernel implementations are platform independent, but may still later be compiled into highly optimized, hardware-specific binaries, such as on runtime computing system 12.

Once development computing system 4 has generated distributable software 10, runtime computing system 12, as part of the DASH runtime, may execute software 10, which includes application source code 6 and computational source code 8, as will be described in further detail below. In particular, during execution of application source code 6, runtime computing system 12 may compile computational source code 8 into optimized, hardware-specific code that is executed by one or more of processing units 14. As noted above, computational source code 8 may comprise OpenCL kernel code. OpenCL code may provide a powerful abstraction of specialized computing hardware, enabling software developer 2 to create platform-independent computational kernels, in computational source code 8, and rely on the compiler of runtime computing system 12 to do the work of converting those kernels into optimized, hardware-specific code that is executable by one or more of processing units 14. Each instance or application context of this hardware-specific code is specific to one of processing units 14, and separate kernels instances may be executed by one or more of processing units (e.g., in parallel). In such fashion, during execution of application source code 6, runtime computing system 12 is capable of managing the execution of computational source code 8 on different available hardware components, namely processing units 14.

In some examples, and as will be described in further detail below, during execution of a software application (e.g., application source code 6) on runtime computing system 12, runtime computing system 12 may identify platform-independent instructions (e.g., computational source code 8) configured to perform at least one computational task. The platform-independent instructions have a platform-independent format (e.g., LLVM bitcode format) that is not specific to any particular processing unit of processing units 14. Runtime computing system 12 determines one or more scheduling criteria that are associated with the platform-independent instructions and selects, from processing units 14 based on the one or more scheduling criteria, a particular processing unit (e.g., processing unit 14A) to perform the at least one computational task. Runtime computing system 12 converts the platform-independent instructions into platform-dependent instructions, wherein the platform-dependent instructions have a platform-dependent format that is specific to the selected processing unit (e.g., specific to processing unit 14A, which may comprise a GPU or an FPGA). The selected processing unit may then execute the platform-dependent instructions to perform the at least one computational task.

The use of development computing system 4 and runtime computing system 12 may enable end user 15 to choose hardware configurations for processing units 14 based on a particular operating environment and processing demands. For example, end user 15 can select processing units 12 (e.g., off-the-shelf components, such as GPU's, FPGA's, CPU's) that meet particular operational and environmental requirements, confident in the knowledge that execution of software 10, and particularly source code 8, will utilize the capabilities of the various hardware resources during execution of application source code 6 and computational source code 8 on runtime computing system 12. If desired, end user 15 can also incrementally upgrade and/or change the configuration or types of processing units included in processing units 14, without necessarily having to rely on software 10 specifically supporting that hardware. At the same time, software developer 2 is free to author or otherwise create application source code 6 and computational source code 8 without necessarily having to know the exact hardware configuration of runtime computing system 12 used by end user 15, or the precise types of processing units 14 used in runtime computing system 12. Instead, software developer 2 may author computational source code 8 in a platform-independent format (e.g., in OpenCL), with the knowledge that runtime computing system 12 will be responsible for converting this device-independent code into separate instances of executable code that are each specific to a particular one of processing units 14.

Figure 2:
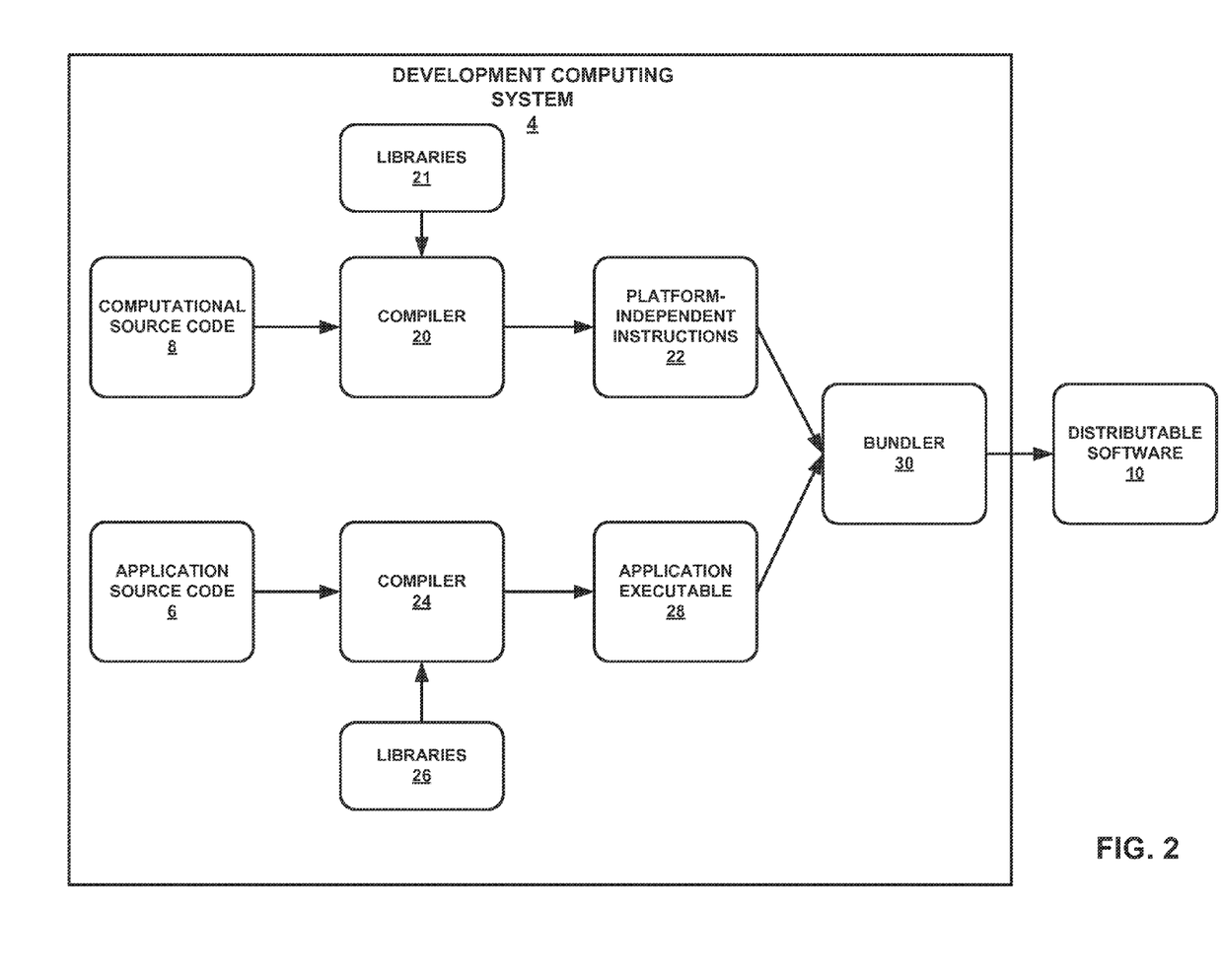
FIG. 2 is a block diagram illustrating one example of the development computing system shown in FIG. 1, in accordance with one or more aspects of the present disclosure.

FIG. 2 is a block diagram illustrating one example of development computing system 4 shown in FIG. 1, in accordance with one or more aspects of the present disclosure. As illustrated in the example of FIG. 2, development computing system 4 generates distributable software 10 based on application source code 6 and computational source code 8. To do so, development computing system 4 utilizes compiler 20 and compiler 24.

Software developer 2 (FIG. 1) may write a portion of a software application, or host software, by generating application source code 6 using any programming language and software development toolchain. However, in various cases, software developer 2 may identify one or more computationally intensive and/or parallelizable functions (e.g., a linear algebra solver), such as by, e.g., software profiling and/or automated tools. Software developer 2 may refactor or write these functions by generating computational source code 8. In some examples, computational source code 8 may comprise OpenCL kernel code. In certain examples, software developer 2 may use existing OpenCL-accelerated libraries, such as Boost.Compute, MAGMA, and/or clMath. Software developer 2 uses compiler 20 to compile computational source code 8 (e.g., kernel source code) into platform-independent instructions 22, which may comprise intermediate hardware-independent binaries.

Compiler 24 of development computing system 4 compiles application source code 6 into application executable 28 using one or more libraries 26. In some examples, when computational source code 8 includes OpenCL code, libraries 26 may provide an abstraction layer on top of OpenCL to provide application executable 28 with the references into platform-independent instructions 22 (described below), and these references may be resolved at run time during execution of the software application on runtime computing system 12. In some cases, libraries 26 may not be used by compiler 24 when generating application executable 28.

Compiler 20 of development computing system 4 compiles computational source code 8 into platform-independent instructions 22, which may comprise intermediate hardware-independent binaries. In various examples, as noted above, computational source code 8 comprises OpenCL code, and platform-independent instructions 22.

Figure 3:
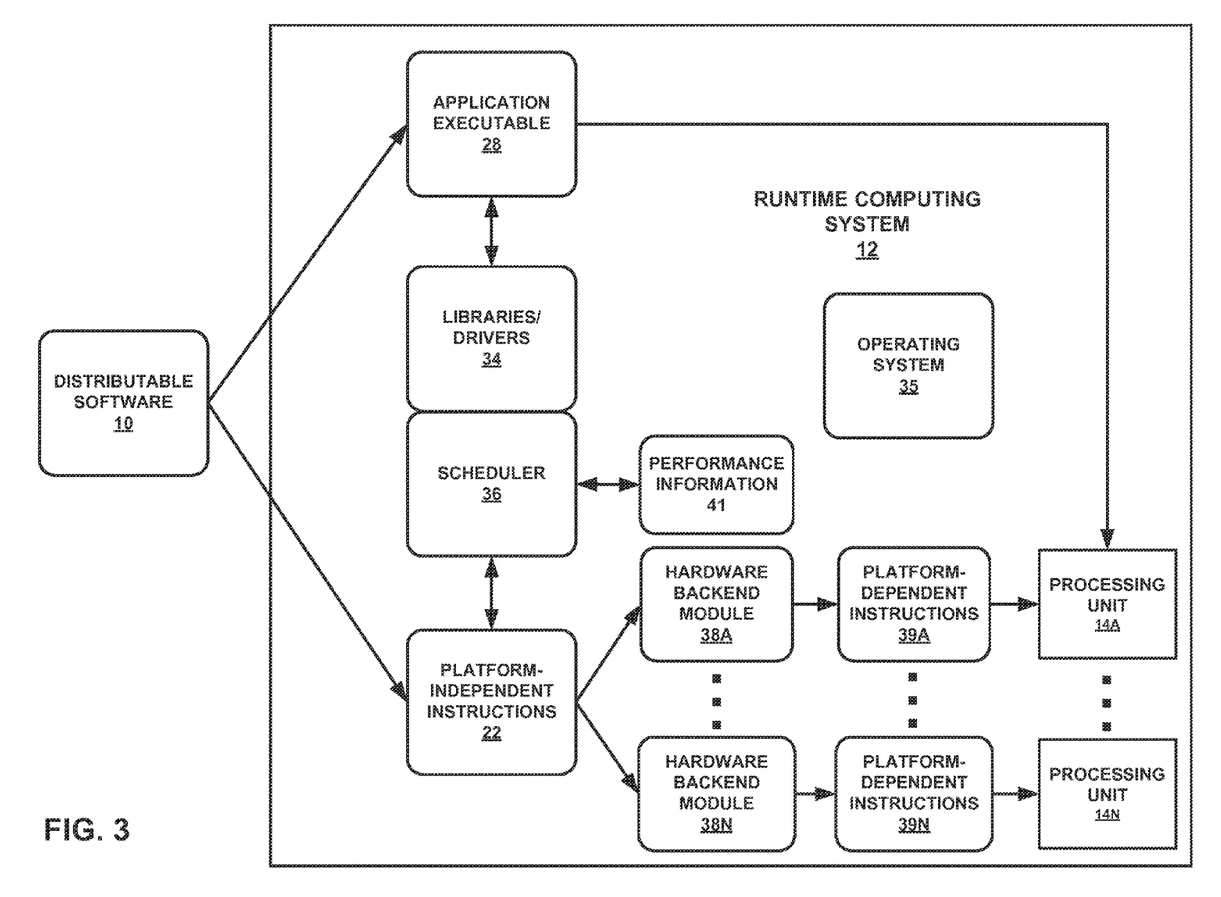
FIG. 3 is a block diagram illustrating one example of the runtime computing system shown in FIG. 1, in accordance with one or more aspects of the present disclosure.

OpenCL may provide an application programming interface (API) and one or more libraries (e.g., libraries/drivers 34) for managing kernels and hardware resources so that application software can run kernels on particular specialized hardware components on runtime computing system 12. On runtime computing system 12, the host software may use a DASH API to execute computational kernels, almost as if it were calling a regular function. DASH's software development toolchain uses compiler 20 to build OpenCL kernels in platform-independent instructions 22, which enables DASH to compile the kernels into LLVM's hardware-independent binary representation, called bitcode.

In various examples, compiler 20 may comprise a compiler front-end, such as a Low Level Virtual Machine (LLVM) compiler front-end (e.g., LLVM-GCC or Clang), to generate platform-independent instructions 22. LLVM can output a platform-independent binary format, the Intermediate Representation (IR). Clang supports OpenCL and C/C++. GCC-based compiler front-ends for LLVM are available for many programming languages, including C, C++, Java, Ruby, Python, PHP, Fortran, and others. Compiler 20 is operable to compile computational source code 8 (e.g., OpenCL kernel code) into platform-independent instructions 22, which may comprise LLVM's platform-independent IR, called bitcode, which is both platform-agnostic and language-agnostic. Compiler 20 may, in some cases, utilize one or more libraries 21, such as libcic and one or more standard OpenCL libraries. Libclc is an OpenCL support library for Clang/LLVM. LLVM tools of runtime computing system 12 are operable to convert bitcode into optimized native code for any supported hardware platform of runtime computing system 12.

In certain examples, platform-independent instructions 22 may have a format that complies with the Standard Portable Intermediate Representation (SPIR). In some cases, platform-independent instructions 22 may have a format that complies with SPIR-V.

Upon generation of platform-independent instructions 22 and application executable 28, bundler 30 of development computing system 4 is capable of bundling, or combining, application executable 28 and platform-independent instructions 22 into distributable software 10, which may comprise a single software package that can be distributed to end users (e.g., end user 15 illustrated in FIG. 1). As will be described in further detail in FIG. 3, runtime computing system 12 is operable to execute application executable 28 and, during execution, convert platform-independent instructions 22 (e.g., LLVM bitcode) into platform-dependent instructions (e.g., optimized native code) for any supported hardware platform (e.g., platform supported by one or more of processing units 14) of runtime computing system 12. Platform-independent instructions 22 may comprise instructions to perform one or more computational tasks (e.g., one or more computationally intensive and/or parallelizable tasks).

FIG. 3 is a block diagram illustrating one example of runtime computing system 12 shown in FIG. 1, in accordance with one or more aspects of the present disclosure. As noted above, runtime computing system 12 is operable to execute application executable 28, which is included in software 10. During execution of application executable 28, runtime system 12 also processes platform-independent instructions 22 (e.g., kernel binaries), which are extracted from distributable software 10, and utilize respective hardware-specific backend modules 38A-38N to produce platform-dependent instructions 39A-39N (collectively, platform-dependent instructions 39), as will be described in further detail below. As noted above, platform-independent instructions 22 may comprise instructions to perform one or more computational tasks, such as one or more computationally intensive and/or parallelizable tasks.

End user 15, shown in FIG. 1, may install software 10, along with libraries/drivers 34 (e.g., one or more OpenCL drivers and/or libraries), scheduler 36, performance information 41, and one or more hardware backend modules 38A-38N (collectively, hardware backend modules 38) on runtime computing system 12. Runtime computing system 12 may also include one or more processing units 14A-14N (collectively, processing units 14), and also an operating system 35 (e.g., Linux operating system). When runtime computing system 12 executes application executable 28 using libraries/drivers 34, the execution of application executable 28 causes scheduler 36 to process platform-independent instructions 22. Platform-independent instructions 22 are referenced by application executable 28 based upon prior compilation of application executable 28 from application source code 6 using libraries 26. Runtime computing system 12 automatically uses hardware-specific backend modules 38 to produce executable code (e.g., platform-dependent instructions 39) for the hardware present on runtime computing system 12 (e.g., processing units 14). Scheduler 36 is configured to automatically distribute platform-independent instructions 22 (which may, in various examples, comprise instructions compiled from OpenCL kernel code) among the different hardware resources on runtime computing system 12 as they are used by application executable 28, such that each hardware resource has the opportunity of being utilized.

In various examples, libraries/drivers 34 includes one or more libraries and/or drivers that are used by, control, or otherwise interact with application executable 28 during execution. In some cases, libraries/drivers 34 may include OpenCL runtime libraries and/or drivers used with operating system 35 (e.g., Linux). During execution of application executable 28, libraries/drivers 34 may reference or invoke platform-independent instructions 22, based upon earlier compilation of application executable 28 utilizing libraries 26 (FIG. 2). Scheduler 36 accepts instructions from libraries/drivers 34 and may, in some cases, serve as a "virtual device."

Scheduler 36 is capable of optimizing decisions about which hardware resources are used to execute which ones of platform-independent instructions 22. For example, in various cases, platform-independent instructions 22 may comprise one or more computational kernels (e.g., OpenCL kernels). Each time a computational kernel is called via libraries/drivers 34 during execution of application executable 28, scheduler 36 is responsible for determining on which hardware resource (e.g., one or more of processing units 14) the respective kernel will execute. Platform-independent instructions 22 comprise instructions to perform one or more computational tasks (e.g., one or more computationally intensive and/or parallelizable tasks) associated with the one or more computational kernels.

Accordingly, scheduler 36 is able to gather and collect real-time information about the real computational workload and the performance during execution of platform-dependent instructions 39 on different hardware resources of runtime computing system 12. This enables scheduler 36 to learn and optimize which of platform-independent instructions 22 (e.g., kernels), for example, are processed for execution on which processing units 14, while application executable 28 is running and, in some cases, with little to no performance impact. This may provide benefit as specialized hardware may, in some cases, be a limited resource, and there may be an overhead cost to executing kernels on these.

As such, scheduler 36 is capable of efficiently allocating computing resources to the processing of platform-independent instructions 22. The real-time information about the computational workload and the performance during execution of platform-dependent instructions 39 may be stored by scheduler 36 in performance information 41, as illustrated in FIG. 3.

In various examples, scheduler 36 may select which processing unit 14A-14N to perform at least one computational task of platform-independent instructions 22 (e.g., instructions associated with one or more kernels) based at least in part on a determination of one or more scheduling criteria that are associated with platform-independent instructions 22. These scheduling criteria may be based on one or more of the following: information associated with platform-independent instructions 22, information associated with hardware devices provided by runtime computing system 12 (e.g., one or more of processing units 14), or information associated with performance of the at least one computational task by at least one of processing units 14. For instance, the information associated with platform-independent instructions 22 may comprise at least one of a size of platform-independent instructions 22 or a number of times that platform-independent instructions 22 are invoked during execution application executable 28. As one example, if platform-independent instructions 22 include code associated with a particular kernel, the information associated with platform-independent instructions 22 may comprise at least one of a size of this code (e.g., kernel size) or a number of times that this particular kernel is invoked during execution application executable 28.

The information associated with each of processing units 14 may comprise a respective size of program memory associated with each of processing units 14 and/or the number of platform-independent instructions 22 (e.g., number of kernels) that can run on each of processing units 14. The information associated with performance of the at least one computational task may comprise historical performance information (e.g., computational and/or workload history, amount of data for instructions 22 that is moved across a bus to any particular device) associated with prior performance of the at least one computational task by at least one of processing units 14. Scheduler 36 may use any of such information when selecting which processing unit 14A-14N is to execute one or more of platform-independent instructions 22.

In some cases, the historical performance information associated with prior performance of the at least one computational task comprises information associated with one or more resources used by one or more of processing units 14 during prior execution of one or more of platform-dependent instructions 39. For example, during prior execution of one or more of platform-dependent instructions, runtime computing system 12 may monitor one or more of processing units 14 to assess the resource utilization during instruction execution. One or more of these resources may be constrained resources for a given processing unit, and measurements of constrained resources are specific to the platform-dependent instructions that are executed by this given processing unit.

As one example, if processing unit 14A comprises a GPU and processing unit 14N comprises an FPGA, runtime computing system 12 may have previously generated platform-dependent instructions 39A and 39N based on platform-independent instructions 22, where platform-dependent instructions 39A are specific to and executed by processing unit 14A and platform-dependent instructions 39N are specific to and executed by processing unit 14N. Upon execution of platform-dependent instructions 39A and 39N, runtime computing system 12 may determine that execution of platform-dependent instructions 39N by processing units 14N may have, for instance, consumed X logic gates and Y memory cells of processing unit 14N, which may comprise constrained resources of an FPGA. Runtime computing system 12 may also determine that execution of platform-dependent instructions 39A by processing unit 14A may not have resulted in the usage and/or over-usage of constrained resources of processing unit 14A. Information associated with the resource utilization of processing units 14A and 14N during instruction execution can be stored by scheduler 36 in performance information 41.

Continuing with this non-limiting example, at a later time and during a subsequent execution of platform-independent instructions 22, scheduler 36 may determine, based on the resource information stored in performance information 41 associated with the prior execution of platform-dependent instructions 39A and 39N generated from platform-independent instructions 22, which one or more of processing units 14 to select for execution. If performance information 41 indicates that platform-dependent instructions 39N previously generated from platform-independent instructions 22 resulted in one or more constrained resources being utilized for processing unit 14N (FPGA in this example), but that platform-dependent instructions 39A previously generated from platform-independent instructions 22 resulted fewer constrained resources being utilized for processing units 14A (CPU in this example), scheduler 36 may use performance information 41 to determine which one(s) of hardware backend modules 38 (and processing units 14) to select for processing platform-independent instructions 22 (e.g., selecting hardware backend module 38A and processing unit 14A based on a history of fewer constrained resources being utilized processing units 14A than processing unit 14N).

As shown in the example of FIG. 3, each of hardware backend modules 38 may be associated specifically with a respective one of processing units 14. For example, hardware backend module 38A may be associated specifically with processing unit 14A, and hardware backend module 38N may be associated specifically with processing unit 14N. As one example, if processing units 14A comprises a GPU, hardware backend module 38A may comprise a GPU backend module (e.g., LLVM backend module) that is capable of generating platform-dependent instructions 39A from one or more of platform-independent instructions 22, where platform-dependent instructions 39A are specific to the hardware platform of processing units 14A. Hardware backend module 38N is capable of generating platform-dependent instructions 39N from one or more of platform-independent instructions 22, where platform-dependent instructions 39N are specific to the hardware platform of processing units 14N. When scheduler 36 selects one or more of processing units 14 for processing platform-independent instructions 22, the corresponding ones of hardware backend modules 38 are enabled to generate respective platform-dependent instructions 39 for the corresponding, selected ones of processing units 14.

In some cases, upon execution of platform-dependent instructions 39, scheduler 36 (or, in some instances, another component shown in FIG. 3) may store historical performance information 41 that is associated with performance of the at least one computational task by one or more of processing units 14 during execution of platform-dependent instructions 39. This performance information may include, for example, information about computational and/or workload history, or information regarding the amount of data that is moved across one or more busses or channels (e.g., communication channels 50 shown in FIG. 4) of runtime computing system 12, to any particular one of processing units 14, in order to execute platform-dependent instructions 39. As described above, the historical performance information associated with prior performance of the at least one computational task comprises information associated with one or more resources used by the selected processing unit during prior execution of the platform-dependent instructions by the selected processing unit.

In some cases, the amount of data that is moved across a communication channel during instruction execution may be significant with respect to performance, as well as the amount of time to transport the data across the communication channel. Performance information 41 may also be indicative of the amount of time for platform-dependent instructions 39 to be executed by processing units 14, which may include the amount of time to generate platform-dependent instructions 39 from platform-independent instructions 22 by hardware backend modules 38.

As one example, if processing unit 14A comprises a GPU, performance information 41 may include historical performance information that is associated with execution of platform-dependent instructions 39A, such as the amount of data that is moved across a communication channel to processing unit 14A associated with execution of platform-dependent instructions 39A, and/or the amount of time to send the data across the communication channel. Performance information 41 may also indicate the amount of time for execution of platform-dependent instructions 39A by processing unit 14A, which may include the amount of time to generate platform-dependent instructions 39A from platform-independent instructions 22 by hardware backend module 38A.

As a result, scheduler 36 is able to gather and collect real-time information about the real computational workload and the performance during the processing of platform-independent instructions 22 and execution of corresponding platform-dependent instructions 39 on different hardware resources of runtime computing system 12. This enables scheduler 36 to learn and optimize which instructions, for example, are executed on which processing units 14 (e.g., based on one or more of information associated with platform-independent instructions 22, information associated with processing units 14, and/or other performance information, as described above), while application executable 28 is running. As such, scheduler 36 is capable of efficiently allocating computing resources to the processing of platform-independent instructions 22.

Runtime computing system 12 uses a variety of hardware backend modules 38 to convert platform-independent instructions 22, which may comprise intermediate binaries, into platform-dependent instructions 39. Platform-dependent instructions 39 may comprise executable binaries that may be executed by processing units 14. In some non-limiting examples, when platform-independent instructions 38A comprise LLVM bitcode, hardware backend modules 38 comprise one or more LLVM backend modules. Although not shown, runtime computing system 12 may further include native runtime libraries (e.g., LLVM libraries) that are linked with LLVM machine code to generate platform-dependent instructions 39.

Processing units 14 may comprise a heterogeneous collection of different types of processing units. For example, processing units 14 may comprise one or more CPU's, one or more GPU's, and/or one or more FPGA's. Each of hardware backend modules 38 may correspond to a respective one of processing units 14. For instance, if processing unit 14A is a GPU, hardware backend module 38A may comprise a GPU backend module (e.g., LLVM backend for a GPU). In particular, hardware backend module 38A may comprise a GPU backend module that is associated with the particular type of GPU comprised by processing unit 14A. Hardware backend module 38A, in this case, would be configured to generate platform-dependent instructions 39A based upon platform-independent instructions 22. As one example, hardware backend module 38A may compile platform-independent instructions 22 to generate platform-dependent instructions 39A having a format that is specific to, and executable by, processing unit 14A (which, in this example, comprises a GPU).

Similarly, if processing unit 14N is an FPGA, hardware backend module 38N may comprise a FPGA backend module (e.g., LLVM backend for an FPGA) that is particular to this type of FPGA in processing unit 14N. Hardware backend module 38N would be configured to generate platform-dependent instructions 39N based upon platform-independent instructions 22, where platform-dependent instructions 39N have a format that is specific to, and executable by, processing unit 14N (which, in this example, comprises an FPGA). In certain cases, if processing unit 14N is an FPGA, platform-dependent instructions 39N may comprise Very High Speed Integrated Circuits (VHSIC) Hardware Description Language (VHDL) code, which can subsequently be used to program an FPGA. As another example, if processing units 14 include a CPU (e.g., processing unit 14B), hardware backend modules 38 include a respective backend module (e.g., hardware backend module 38B) that is configured to generate platform-dependent instructions (e.g., platform-dependent instructions 39B) that are specific to and executable by the CPU. In such fashion, hardware backend modules 38 are capable of translating platform-independent instructions 22 (e.g., for one or more computational kernels) into hardware-specific forms and executes them on the hardware present in runtime computing system 12. Scheduler 36 is capable of calling and managing the appropriate backend module of hardware backend modules 38 based on the hardware present and types of processing units 14 present on runtime computing system 12, such that hardware backend modules 38 may generate hardware-specific compiled kernels (e.g., platform-dependent instructions 39) that are executable by respective ones of processing units 14.

In some cases, runtime computing system 12 may (e.g., using one of hardware backend modules 38A-38N) convert platform-independent instructions 22 (e.g., LLVM bitcode) into another intermediate language that may be more platform-specific but not fully platform-specific to processing units 14A-14N. Certain libraries/drivers (e.g., libraries/drivers 34, such as one or more OpenCL drivers) may then convert that intermediate code into actual executable code that is fully platform-specific for one of processing units 14A-14N.

In some examples, application executable 28, libraries/drivers 34, scheduler 36, operating system 35, and/or one or more of backend modules 38 may be executed or otherwise operable by one or more processing units, such as one or more of processing units 14 and/or other processing units of runtime computing system 12.

In many cases, the implementation and utilization of development computing system 4 and runtime computing system 12 for DASH may provide an interface to hardware systems built from commercial, off-the-shelf components. For instance, a single software application is capable of executing, with hardware-accelerated performance, instructions on many different processing units 14 of a distributed computing system (e.g., runtime computing system 12), even when individual processing units may have different hardware configurations. This enables an end user to choose hardware configurations based on the operating environment and processing demands (e.g., for runtime computing system 12). It also enables upgrading individual hardware components or entire computing systems without necessarily creating compatibility issues. Since runtime computing system 12 (e.g., using hardware backend modules 38) performs final compilation and optimization at run time, platform-dependent instructions 39 that run on specialized hardware are optimized for that specific piece of hardware (e.g., the hardware architecture of one or more of processing units 14).

Hardware acceleration with DASH may provide significant to the end user (e.g., end user 15 shown in FIG. 1). For many computational workloads, including modeling and simulation, GPU's have been shown to provide, e.g., one to three orders of magnitude better performance than CPU's. Other specialized hardware, such as FPGA's, low-power CPU's, and co-processors promise similar benefits, depending on requirements and workload. With DASH, the end user can select hardware appropriate for his or her requirements and workload without necessarily relying on the application (e.g., distributable software 10) to specifically support that hardware, and may be able to reduce hardware cost, physical size, and/or power requirements, compared to general-purpose computing platforms.

DASH may allow software developers (e.g., software developer 2) to create applications that efficiently leverage the capabilities of heterogeneous specialized computing hardware in high-performance computing environments without necessarily tying their software to particular vendors or hardware architectures. As a result, DASH gives users of their software flexibility in choosing computing hardware and enables the end user to potentially improve their computing system's overall performance. In non-limiting examples, DASH may use the OpenCL API and runtime and LLVM intermediate representation to enable software authors to create and use portable, hardware-independent computing kernels. The DASH runtime environment provided by runtime computing system 12 executes these kernels on available hardware, translating them to optimized, hardware-specific code at runtime.

DASH may provide increased computational power and the capacity for enhanced computational capabilities through the use of specialized computing hardware, including FPGA's and/or GPU's, and DASH's hardware-agnostic design may provide the benefits of hardware-accelerated computing in a distributed computing environment containing heterogeneous hardware resources (e.g., amongst processing units 14 in runtime computing system 12). DASH allows computational software (e.g., platform-independent instructions 22) to take advantage of GPU's, FPGA's, and other specialized computational hardware, which may offer multiple order of magnitude improvements in processing power, computing per dollar, and computing per watt. In addition, as there are many existing OpenCL-based computing libraries, software developers may, in various examples of the techniques described herein, be able to use existing OpenCL code with DASH, making it easy to create hardware-accelerated software.

In many instances, the use of DASH may allow support of the same software (e.g., software 10) running efficiently on different hardware platforms that target different environmental and operational requirements, such as on different processing units 14 of runtime computing system and/or across different computing systems providing different hardware platforms or configurations. Software using DASH may automatically use any specialized computational hardware available on a computing system, enabling end users to tailor individual hardware platforms to meet specific requirements. As described above, DASH may use OpenCL and LLVM bitcode so that distributed software (e.g., software 10) may be independent of specific hardware platforms and/or proprietary technologies. Translation to hardware-specific binaries, such as platform-dependent instructions 39, may be performed on the fly at run time.

Figure 4:
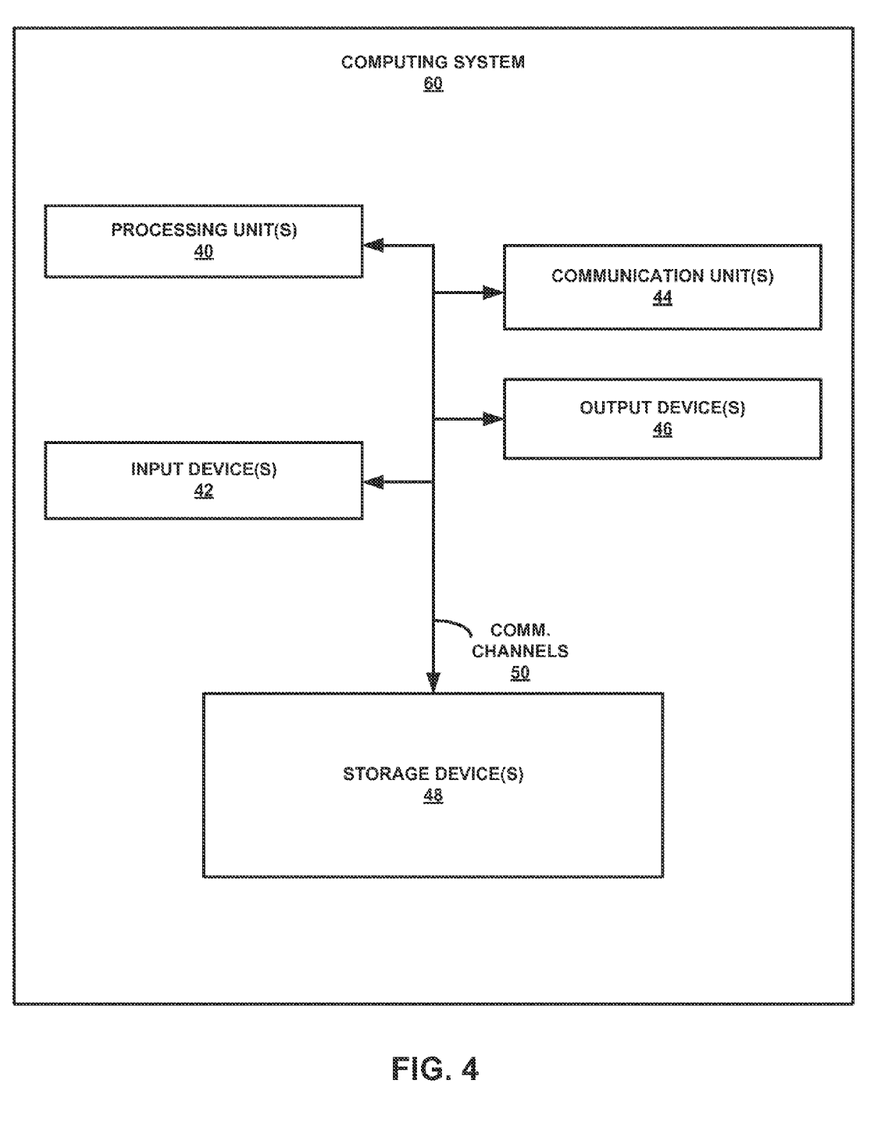
FIG. 4 is a block diagram illustrating further details of an example computing system, in accordance with one or more aspects of the present disclosure.

FIG. 4 is a block diagram illustrating further details of an example computing system 60, such as one or more of the computing systems (e.g., development computing system 4, runtime computing system 12) shown in FIGS. 1-3, in accordance with one or more aspects of the present disclosure. FIG. 4 illustrates only one particular example of computing system 60, and many other examples of computing system 60 may be used in other instances and may include a subset of the components shown, or may include additional components not shown, in FIG. 4.

As shown in the example of FIG. 4, computing system 60 includes one or more processing units 40, one or more input devices 42, one or more communication units 44, one or more output devices 46, and one or more storage devices 48. Communication channels 50 may interconnect each of the components 40, 42, 44, 46, and 48 for inter-component communications (physically, communicatively, and/or operatively). In some examples, communication channels 50 may include a system bus, a network connection, an inter-process communication data structure, or any other method for communicating data between hardware and/or software.

One or more input devices 42 of computing system 60 may receive input. Examples of input are tactile, audio, and video input. Examples of input devices 42 include a presence-sensitive screen, touch-sensitive screen, mouse, keyboard, voice responsive system, video camera, microphone or any other type of device for detecting input from a human or machine.

One or more output devices 46 of computing system 60 may generate output. Examples of output are tactile, audio, and video output. Examples of output devices 46 include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating tactile, audio, and/or visual output.

One or more communication units 44 of computing system 60 may communicate with one or more other computing systems or devices via one or more networks by transmitting and/or receiving network signals on the one or more networks. Examples of communication unit 44 include a network interface card (e.g. such as an Ethernet card), an optical transceiver, a radio frequency transceiver, or any other type of device that can send and/or receive information, such as through a wired or wireless network. Other examples of communication units 44 may include short wave radios, cellular data radios, wireless Ethernet network radios, as well as universal serial bus (USB) controllers.

One or more storage devices 48 within computing system 60 may store information for processing during operation of computing system 60 (e.g., computing system 60 may store data accessed by one or more modules, processes, applications, or the like during execution at computing system 60). In some examples, storage devices 48 on computing system 60 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 48 may include redundant array of independent disks (RAID) configurations and one or more solid-state drives (SSD's).

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with one or more software/firmware elements or modules.

For example, when computing system 60 comprises an example of development computing system 4 shown in FIG. 1, storage devices 48 may store application source code 6 and computational source code 8. In addition, storage devices 48 may store instructions and/or data associated with libraries 26, application executable 28, platform-independent instructions 22, compiler 24, compiler 20, and/or bundler 30 shown in FIG. 2.

In other examples, when computing system 60 comprises an example of runtime computing system 12, storage devices 48 may store instructions and/or data associated with application executable 28, libraries/drivers 34, scheduler 36, performance information 41, operating system 35, platform-independent instructions 22, hardware backend modules 38, and platform-dependent instructions 39, as shown in FIG. 3.

Computing system 60 further includes one or more processing units 40 that may implement functionality and/or execute instructions within computing system 60. For example, processing units 40 may receive and execute instructions stored by storage devices 48 that execute the functionality of the elements and/or modules described herein. These instructions executed by processing units 40 may cause computing system 60 to store information within storage devices 48 during program execution. Processing units 40 may also execute instructions of the operating system (e.g., operating system 35) to perform one or more operations described herein. In those examples in which computing system 60 comprises runtime computing system 12, processing units 40 may comprise an example of processing units 14 shown in FIG. 3.

Figure 5:
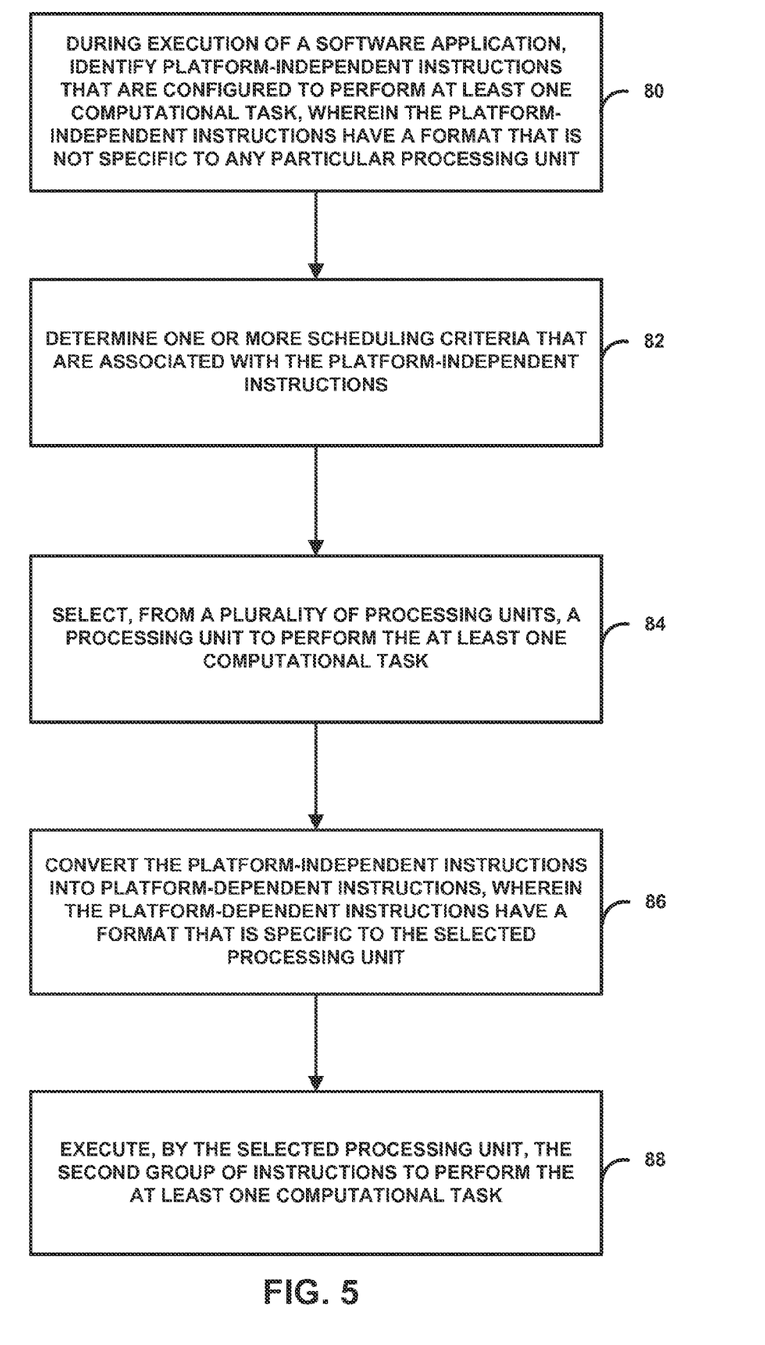
FIG. 5 is a flow diagram illustrating an example process that may be performed by a computing system, in accordance with one or more aspects of the present disclosure.

FIG. 5 is a flow diagram illustrating an example process that may be performed by a computing system, in accordance with one or more aspects of the present disclosure. For example, the process illustrated in FIG. 5, which may comprise one or more operations, may be performed by runtime computing system 12.

As illustrated in FIG. 5, the process may include, during execution of a software application in a computing system comprising a plurality of processing units (e.g., processing units 14), identifying platform-independent instructions (e.g., platform-independent instructions 22) that are configured to perform at least one computational task (80). The plurality of processing units comprises a heterogeneous group that includes at least two different types of processing units, and the platform-independent instructions have a format that is not specific to any particular processing unit in the plurality of processing units.

The process of FIG. 5 further includes determining one or more scheduling criteria that are associated with the platform-independent instructions (82) and selecting, from the plurality of processing units based on the one or more scheduling criteria, a processing unit to perform the at least one computational task (84), and converting the platform-independent instructions into platform-dependent instructions (e.g., platform-dependent instructions 39A and/or 39N) (86). The platform-dependent instructions have a format that is specific to the selected processing unit. The process further includes executing, by the selected processing unit, the platform-dependent instructions to perform the at least one computational task (88).

In some examples, the plurality of processing units comprises a group of specialized processing units. For instance, the group of specialized processing units may include at least one of a GPU or a FPGA. The group of specialized processing units may also include a CPU. The platform-independent instructions may comprise a device-independent intermediate representation, such as LLVM bitcode that is compiled from OpenCL source code (e.g., by compiler 20 shown in FIG. 2), SPIR, or SPIR-V.

Converting the platform-independent instructions into the platform-dependent instructions may include compiling the platform-independent instructions into the platform-dependent instructions that are executable by the selected processing unit. The one or more scheduling criteria may be based at least in part on one or more of the following: information associated with the platform-independent instructions, information associated with each processing unit in the plurality of processing units, or information associated with performance of the at least one computational task by at least one processing unit in the plurality of processing units. Any of such information may be, in some examples, stored by runtime computing system 12 in performance information 41.

In some cases, the information associated with the platform-independent instructions comprises a number of times that the platform-independent instructions are invoked during execution of the software application. The information associated with each processing unit in the plurality of processing units may include a respective size of program memory associated with each processing unit. The information associated with performance of the at least one computational task may include historical information associated with prior performance of the at least one computational task by at least one processing unit in the plurality of processing units. In some examples, the process may further include, after executing the platform-dependent instructions by the selected processing unit, storing, in the historical information, information associated with performance of the at least one computational task by the selected processing unit. In some examples, the historical performance information associated with prior performance of the at least one computational task comprises information associated with one or more resources used by the selected processing unit during prior execution of the platform-dependent instructions by the selected processing unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:

during execution of a software application in a computing system comprising a plurality of processing units, identifying platform-independent instructions that are configured to perform at least one computational task associated with execution of the software application, wherein the plurality of processing units comprises a heterogeneous group that includes at least two different types of processing units, wherein, prior to execution of the software application, the platform-independent instructions are compiled from computational source code providing one or more computational functions associated with the software application, wherein the platform-independent instructions have a platform-independent format that is not specific to any particular processing unit of the plurality of processing units, and wherein the platform-independent instructions comprise Low Level Virtual Machine (LLVM) bitcode compiled from the computational source code that is not native to or executable by any particular processing unit of the plurality of processing units;

during execution of the software application, determining one or more scheduling criteria that are associated with the platform-independent instructions, wherein the one or more scheduling criteria are based at least in part on historical performance information associated with prior performance of the at least one computational task by a particular processing unit of the plurality of processing units, wherein the historical performance information comprises information associated with one or more resources used by the particular processing unit during prior performance of the at least one computational task by the particular processing unit, wherein the historical performance information further comprises information associated with an amount of time to previously convert the platform-independent instructions comprising the LLVM bitcode into platform-dependent instructions, and wherein the one or more scheduling criteria are further based on one or more of (a) a number of times that the platform-independent instructions are invoked during execution of the software application, or (b) a respective number of the platform-independent instructions that are executable on each of the plurality of processing units;

during execution of the software application, and after determining the one or more scheduling criteria that are associated with the platform-independent instructions, selecting, from the plurality of processing units and based on the one or more scheduling criteria, the particular processing unit to perform the at least one computational task;

during execution of the software application, converting the platform-independent instructions comprising the LLVM bitcode into the platform-dependent instructions, wherein the platform-dependent instructions comprise optimized native code having a format that is specific to the selected processing unit, and wherein the platform-dependent instructions comprise instructions that are native to and executable by the selected processing unit; and during execution of the software application, executing, by the selected processing unit, the platform-dependent instructions to perform the at least one computational task.

2. The method of claim 1, wherein the plurality of processing units comprises a group of specialized processing units.

3. The method of claim 2, wherein the group of specialized processing units comprise at least one of a graphics processing unit or a field-programmable gate array.

4. The method of claim 1, wherein the platform-independent instructions comprise a device-independent intermediate representation.

5. The method of claim 1, wherein converting the platform-independent instructions into the platform-dependent instructions comprises compiling the platform-independent instructions into the platform-dependent instructions that are executable by the selected processing unit.

6. The method of claim 1, wherein the one or more scheduling criteria are further based on a respective size of program memory associated with each of the plurality of processing units.

7. The method of claim 1, further comprising:
after executing the platform-dependent instructions by the selected processing unit, storing, in the historical performance information, information associated with performance of the at least one computational task by the selected processing unit during execution of the platform-dependent instructions.

8. The method of claim 1, wherein the information is associated with the one or more resources used by the particular processing unit during prior execution of the platform-dependent instructions by the particular processing unit.

9. The method of claim 1, wherein the software application is associated with an application executable previously compiled from application source code using a first compiler, wherein the software application is further associated with the LLVM bitcode that was previously compiled from the computational source code using a second compiler, and wherein the application executable includes references to the LLVM bitcode that are resolved at runtime during execution of the software application in the computing system.

10. The method of claim 1,
wherein the information associated with the one or more resources comprises information associated with one or more constrained resources used by the particular processing unit during prior execution of the platform-dependent instructions that were previously converted from the platform-independent instructions,
wherein measurements of the one or more constrained resources used by the particular processing unit are specific to the platform-dependent instructions converted from the LLVM bitcode and executed by the particular processing unit,
wherein the one or more scheduling criteria are further based on the information associated with the one or more constrained resources, and
wherein the particular processing unit has used fewer of the one or more constrained resources than at least one other of the plurality of processing units.

11. The method of claim 1, wherein converting the platform-independent instructions into the platform-dependent instructions comprises:
converting the LLVM bitcode into intermediate instructions; and
converting the intermediate instructions into the platform-dependent instructions.

12. A computing system, comprising:
a plurality of processing units, wherein the plurality of processing units comprises a heterogeneous group that includes at least two different types of processing units;
wherein one or more of the plurality of processing units are configured to:
during execution of a software application, identify platform-independent instructions that are configured to perform at least one computational task associated with execution of the software application, wherein, prior to execution of the software application, the platform-independent instructions are compiled from computational source code providing one or more computational functions associated with the software application, wherein the platform-independent instructions have a platform-independent format that is not specific to any particular processing unit of the plurality of processing units, and wherein the platform-independent instructions comprise Low Level Virtual Machine (LLVM) bitcode compiled from the computational source code that is not native to or executable by any particular processing unit of the plurality of processing units;
during execution of the software application, determine one or more scheduling criteria that are associated with the platform-independent instructions, wherein the one or more scheduling criteria are based at least in part on historical performance information associated with prior performance of the at least one computational task by a particular processing unit of the plurality of processing units, wherein the historical performance information comprises information associated with one or more resources used by the particular processing unit during prior performance of the at least one computational task by the particular processing unit, wherein the historical performance information further comprises information associated with an amount of time to previously convert the platform-independent instructions comprising the LLVM bitcode into platform-dependent instructions, and wherein the one or more scheduling criteria are further based on one or more of (a) a number of times that the platform-independent instructions are invoked during execution of the software application, or (b) a respective number of the platform-independent instructions that are executable on each of the plurality of processing units;
during execution of the software application, and after determining the one or more scheduling criteria that are associated with the platform-independent instructions, select, from the plurality of processing units and based on the one or more scheduling criteria, the particular processing unit to perform the at least one computational task;
during execution of the software application, convert the platform-independent instructions comprising the LLVM bitcode into the platform-dependent instructions, wherein the platform-dependent instructions comprise optimized native code having a format that is specific to the selected processing unit, and wherein the platform-dependent instructions comprise instructions that are native to and executable by the selected processing unit; and during execution of the software application, execute, by the selected processing unit, the platform-dependent instructions to perform the at least one computational task.

13. The computing system of claim 12, wherein the plurality of processing units comprises a group of specialized processing units.

14. The computing system of claim 12, wherein the platform-independent instructions comprise a device-independent intermediate representation.

15. The computing system of claim 12, wherein the one or more of the plurality of processing units are configured to convert the platform-independent instructions into the platform-dependent instructions at least by compiling the platform-independent instructions into the platform-dependent instructions that are executable by the selected processing unit.

16. The computing system of claim 12, wherein the one or more scheduling criteria are further based on a respective size of program memory associated with each of the plurality of processing units.

17. The computing system of claim 12, wherein after the selected processing unit executes the platform-dependent instructions, the one or more of the plurality of processing units are further configured to store, in the historical performance information, information associated with performance of the at least one computational task by the selected processing unit during execution of the platform-dependent instructions.

18. The computing system of claim 12, wherein the information is associated with the one or more resources used by the particular processing unit during prior execution of the platform-dependent instructions by the particular processing unit.

19. The computing system of claim 12, wherein the software application is associated with an application executable previously compiled from application source code using a first compiler, wherein the software application is further associated with the LLVM bitcode that was previously compiled from the computational source code using a second compiler, and wherein the application executable includes references to the LLVM bitcode that are resolved at runtime during execution of the software application in the computing system.

20. The computing system of claim 12,
wherein the information associated with the one or more resources comprises information associated with one or more constrained resources used by the particular processing unit during prior execution of the platform-dependent instructions that were previously converted from the platform-independent instructions,
wherein measurements of the one or more constrained resources used by the particular processing unit are specific to the platform-dependent instructions converted from the LLVM bitcode and executed by the particular processing unit,
wherein the one or more scheduling criteria are further based on the information associated with the one or more constrained resources, and
wherein the particular processing unit has previously used fewer of the one or more constrained resources than at least one other of the plurality of processing units.

21. The computing system of claim 12, wherein the one or more of the plurality of processing units are configured to convert the platform-independent instructions into the platform-dependent instructions at least by:

converting the LLVM bitcode into intermediate instructions; and
converting the intermediate instructions into the platform-dependent instructions.

22. A non-transitory computer-readable storage medium comprising instructions that, when executed, cause a computing system comprising a plurality of processing units to perform operations comprising:

during execution of a software application, identifying platform-independent instructions that are configured to perform at least one computational task associated with execution of the software application, wherein the plurality of processing units comprises a heterogeneous group that includes at least two different types of processing units, wherein, prior to execution of the software application, the platform-independent instructions are compiled from computational source code providing one or more computational functions associated with the software application, wherein the platform-independent instructions have a platform-independent format that is not specific to any particular processing unit of the plurality of processing units, and wherein the platform-independent instructions comprise Low Level Virtual Machine (LLVM) bitcode compiled from the computational source code that is not native to or executable by any particular processing unit of the plurality of processing units;

during execution of the software application, determining one or more scheduling criteria that are associated with the platform-independent instructions, wherein the one or more scheduling criteria are based at least in part on historical performance information associated with prior performance of the at least one computational task by a particular processing unit of the plurality of processing units, wherein the historical performance information comprises information associated with one or more resources used by the particular processing unit during prior performance of the at least one computational task by the particular processing unit, wherein the historical performance information further comprises information associated with an amount of time to previously convert the platform-independent instructions comprising the LLVM bitcode into platform-dependent instructions, and wherein the one or more scheduling criteria are further based on one or more of (a) a number of times that the platform-independent instructions are invoked during execution of the software application, or (b) a respective number of the platform-independent instructions that are executable on each of the plurality of processing units;

during execution of the software application, and after determining the one or more scheduling criteria that are associated with the platform-independent instructions, selecting, from the plurality of processing units and based on the one or more scheduling criteria, the particular processing unit to perform the at least one computational task;

during execution of the software application, converting the platform-independent instructions comprising the LLVM bitcode into the platform-dependent instructions, wherein the platform-dependent instructions comprise optimized native code having a format that is specific to the selected processing unit, and wherein the platform-dependent instructions comprise instructions that are native to and executable by the selected processing unit; and during execution of the software application, executing, by the selected processing unit, the platform-dependent instructions to perform the at least one computational task.

23. The non-transitory computer-readable storage medium of claim 22, wherein the plurality of processing units comprises a group of specialized processing units.

24. The non-transitory computer-readable storage medium of claim 22, wherein converting the platform-independent instructions into the platform-dependent instructions comprises compiling the platform-independent instructions into the platform-dependent instructions that are executable by the selected processing unit.

25. The non-transitory computer-readable storage medium of claim 22, wherein the one or more scheduling criteria are further based on a respective size of program memory associated with each of the plurality of processing units.

26. The non-transitory computer-readable storage medium of claim 22, wherein the operations further comprise:
after executing the platform-dependent instructions by the selected processing unit, storing, in the historical performance information, information associated with performance of the at least one computational task by the selected processing unit during execution of the platform-dependent instructions.

27. The non-transitory computer-readable storage medium of claim 22, wherein the information is associated with the one or more resources used by the particular processing unit during prior execution of the platform-dependent instructions by the particular processing unit.

28. The non-transitory computer-readable storage medium of claim 22, wherein the software application includes references to the LLVM bitcode that are resolved at runtime during execution of the software application in the computing system.

29. The non-transitory computer-readable storage medium of claim 22,
wherein the information associated with the one or more resources comprises information associated with one or more constrained resources used by the particular processing unit during prior execution of the platform-dependent instructions that were previously converted from the platform-independent instructions,
wherein measurements of the one or more constrained resources used by the particular processing unit are specific to the platform-dependent instructions converted from the LLVM bitcode and executed by the particular processing unit,
wherein the one or more scheduling criteria are further based on the information associated with the one or more constrained resources, and
wherein the particular processing unit has used fewer of the one or more constrained resources than at least one other of the plurality of processing units.

30. The non-transitory computer-readable storage medium of claim 22, wherein converting the platform-independent instructions into the platform-dependent instructions comprises:
converting the LLVM bitcode into intermediate instructions; and
converting the intermediate instructions into the platform-dependent instructions.

31. The non-transitory computer-readable storage medium of claim 22, wherein the software application is associated with an application executable previously compiled from application source code using a first compiler, wherein the software application is further associated with the LLVM bitcode that was previously compiled from the computational source code using a second compiler, and wherein the application executable includes references to the LLVM bitcode that are resolved at runtime during execution of the software application in the computing system.

* * * * *

UNITED STATES PATENT AND TRADEMARK OFFICE
CERTIFICATE OF CORRECTION

PATENT NO. : 9,983,857 B2
APPLICATION NO. : 14/741399
DATED : June 16, 2015
INVENTOR(S) : Judson Powers and Noel E. Schmidt Page 1 of 1

It is certified that error appears in the above-identified patent and that said Letters Patent is hereby corrected as shown below:

In the Specification

Column 1, Line 5: Insert the following paragraph:
--STATEMENT REGARDING FEDERALLY SPONSORED RESEARCH OR DEVELOPMENT
This invention was made with government support under Contract No. HQ0147-15-C-7106 and Contract No. HQ0147-16-C-7717 awarded by the Missile Defense Agency, US Department of Defense. The government has certain rights in this invention.--

Signed and Sealed this
Twenty-first Day of May, 2019

Andrei Iancu
*Director of the United States Patent and Trademark Office*